Oct. 24, 1933.    I. D. PERRY    1,931,770
DOOR BUMPER AND THE LIKE
Original Filed April 2, 1931
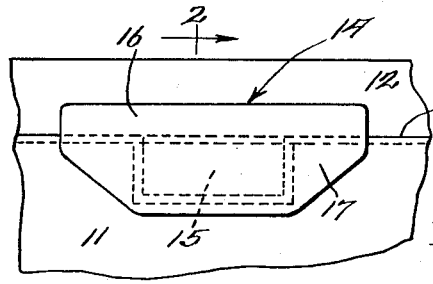
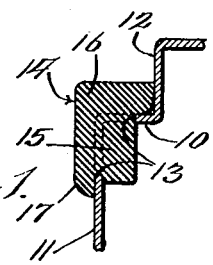
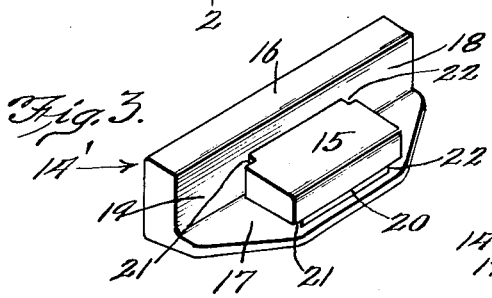
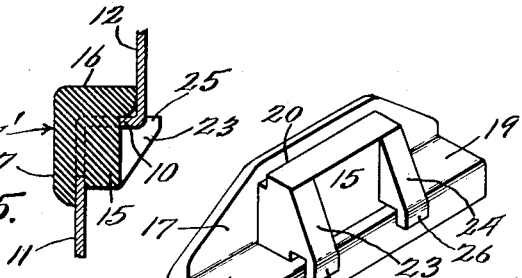
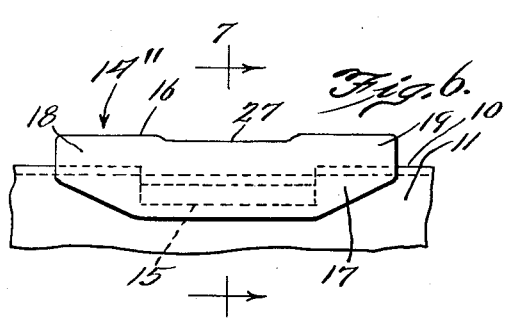
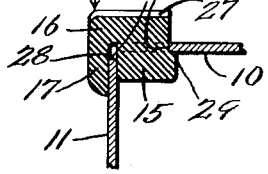
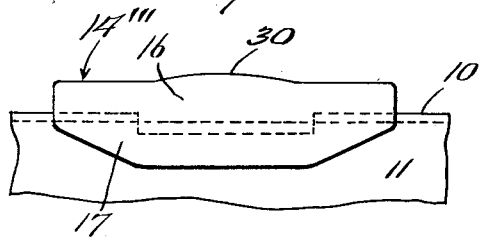
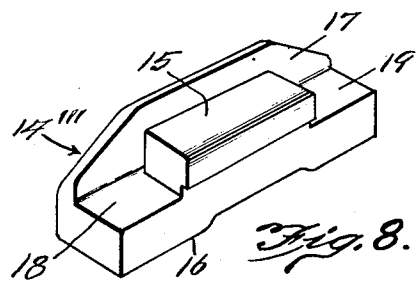
Inventor:
Ira D. Perry Patented Oct. 24, 1933

1,931,770

UNITED STATES PATENT OFFICE 1,931,770

DOOR BUMPER AND THE LIKE

Ira D. Perry, Chicago, Ill., assignor to Edna L. Meyer, Rockford, Ill.

Original application April 2, 1931, Serial No. 527,129. Divided and this application September 16, 1931. Serial No. 563,056

1 Claim. (Cl. 16—86)

This invention has to do with improvements in door bumpers for automobile bodies and the like. The invention herein disclosed has reference particularly to improvements in door stops for vehicles such as automobiles, etc., but the features of invention are not limited to this or any other particular class of service. However, in view of the fact that these door bumpers are generally used in connection with the doors of such vehicles, I have illustrated and will describe this particular application of the invention, but in so doing, I wish it clearly understood that I do not intend thereby to limit myself except as I may do so in the claim.

The doors of vehicles such as automobiles, etc., are usually provided with a contacting edge portion which moves into or towards a shoulder or ledge formed along a permanent portion of the structure of the vehicle, such as the door pillar thereof. This door pillar is usually provided with a companion ledge, the pillar having a ledge surface against or towards which the companion edge surface portion of the door approaches when the door is shut. This surface of the pillar faces in the direction of door closing movement. The pillar is also provided with another surface approximately at right angles to the surface just referred to, and lying substantially parallel to the direction of door closing movement.

There are in use at this time door pillars which are provided with openings in the ledge and facing in the direction of door closing movement, into which openings there are set and secured door bumpers or stops of resilient material to receive the impact and pressure incident to the door closing operation. In some cases these door pillars are provided with openings which extend over into one of the pillar flanges, the opening in such case being formed in the angle of junction of the ledge and flange portions.

There are also in use at this time door bumpers or stops comprising blocks of resilient material such as rubber which are set into the door pillar openings aforesaid and suitably held in place therein. These previous types of construction, however, are objectionable in the sense that the force of pressure or impact incident to the door closing movement has been communicated from the door bumper to the door pillar only through a relatively small supporting surface, usually comprising the edge portion of the thickness of metal of which the door pillar is made. This has been objectionable for the reason that the door bumper so supported is soon cut and damaged due to lack of sufficient support and furthermore its position with respect to the door pillar becomes changed so that its effectiveness to resist pressure and shock is materially reduced.

The main object of the present invention is to provide a form of construction of door bumper which can be used in connection with door pillars having such openings as above explained, but which bumpers are so arranged and related to the ledge of the door pillar as to provide a greatly increased area of support so as to enable the bumper to effectively resist the shock and pressure incident to the door closing operation. In this connection it is a further object to so form and arrange the door bumper blocks that they can be set into and directly associated with the door pillar openings without change of construction or design of said door pillar openings and without the necessity of using special clips or supporting devices for retaining the bumpers in place.

More specifically it is an object of the invention to provide door bumpers having relatively large end supporting surface portions which are directly supported by the ledge of the door pillar at points immediately adjacent to the door pillar opening, in combination with a body portion on the bumper block which body portion seats through the door pillar opening and is directly supported in place therein.

Still more specifically, it is a further object to provide a door bumper construction in which provision is made for relieving the bumper block from any tendency toward cutting action. This result is accomplished by so forming the bumper block that the same is subjected to pressure only at points where it is directly supported by the ledge of the door pillar, the intermediate or central portion of the bumper block being so formed that it is not subjected to such direct pressure.

Another feature of the invention relates to the provision of an arrangement such that the bumper block can be readily snapped or pressed into place through the opening of the door pillar, whereupon it will lock into such position and be effectively retained therein.

Other objects and uses of the invention will appear from a detailed description of the same which consists in the features of construction and combinations of parts hereinafter described and claimed.

This application is a division of my copending application Serial No. 527,129.

In the drawing

Figure 1 shows a face view of a portion of the door pillar having applied thereto a door bumper embodying the features of the present invention;

Figure 2 shows a cross section on the line 2—2 of Figure 1, looking in the direction of the arrows;

Figure 3 shows a back perspective view of the door bumper of Figures 1 and 2;

Figure 4 shows a view similar to Figure 3 but illustrating a modified form of construction in which there are provided hooks for retaining the bumper block in place on the door pillar;

Figure 5 is a view similar to that of Figure 2 but illustrating the form of block shown in Figure 4;

Figure 6 shows a view similar to that of Figure 1, but illustrating another modified form of construction;

Figure 7 shows a cross section on the line 7—7 of Figure 6 looking in the direction of the arrows;

Figure 8 shows a back perspective view of the bumper block shown in Figures 6, and 7; and Figure 9 shows a view similar to Figures 1 and 6 but illustrating another modified type of construction.

In the constructions illustrated the door pillar is made of sheet metal folded to establish the ledge 10 which faces in the direction of door closing movement and the flanges 11 and 12 which lie parallel to the direction of door closing movement. The edge portion of the door is provided with a ledge or lip which moves toward or against the ledge 10 during the door closing movement, and the edge portion of the door is also provided with an edge surface which wipes past the flange 11 when the door is closed.

The door pillar is provided with an opening 13 in the angle between the ledge 10 and the flange 11. This opening is intended to receive the body portion of the resilient bumper block; and as already explained there are in use at this time a large number of body constructions which include this feature. I provide according to one feature of the present invention a bumper block of resilient material designated in its entirety by the numeral 14. The same includes a body section or portion 15 which is of proper size and shape to set through the opening 13. The said resilient block is also provided with a top or head portion 16 which rests against the ledge 10 and is supported thereby, and the resilient block is also provided with a downwardly extending flange or lip 17 which overlies the flange 11 of the door pillar as best indicated in Figure 1.

Examination of Figures 1 and 3 in particular indicates that the head portion 16 is of considerably greater length than the body portion 15 and overlies the opening 13 at both ends thereof so that the end extensions 18 and 19, directly rest upon and are supported by the ledge 10 at the sides of the opening 13. The result is that the forces of pressure and impact incident to the closing of the door are directly communicated to the ledge 10 through the support of the end portions 18 and 19 thereon and examination of Figures 1 and 3 shows that these portions are of substantial size and are therefore well able to receive and absorb these forces. As a result the principal forces incident to the closing of the door are not required to be delivered into the door pillar through the body portion 15 of the bumper block, and consequently the tendency to shear said body portion 15 on the relatively sharp edge of the flange 11 at the position of the opening 13 is minimized.

In order to retain the bumper block in place its body portion 15 is shown as provided with a groove 20 along the lower line of junction with the flange or skirt 17, and with other grooves 21 and 22 along the end lines of joinder of the body portion 15 with the head 16 and flange or skirt 17. The parts are so proportioned that by compressing the body portion 15 slightly it can be forced into place through the opening 13; whereupon it will expand into the locked position and will be effectively retained in place on the door pillar.

The construction shown in Figures 4 and 5 is similar to that already described, but in the present case a somewhat different means for locking the bumper block in place is illustrated. In the present case the body portion 15 of the bumper block is provided with a pair of rearwardly extending lugs 23 and 24 whose upper end portions 25 and 26 are hooked and are adapted to engage behind the edge portion of the flange 12 of the door pillar when the bumper block is set into place. In the present case the bumper block is provided with the grooved portion 20 along the lower line of joinder of the body portion 15 with the flange or skirt 17 so that when the bumper block is in place this portion thereof is hooked to the door pillar flange 11 and serves in conjunction with the hook portions 25 and 26 to very effectively retain the bumper block in place. It will be understood that in Figure 4 the bumper block is illustrated in an inverted upside down position.

In the modified construction shown in Figures 6, 7, and 8 the door pillar opening 13 is of reduced dimension measured along the flange 11. In the present case also the head portion 16 of the bumper block is provided with the end extensions 18 and 19 which overlie and are directly supported by the ledge 11; but the central or body portion of the bumper block is relieved as shown at 27 in Figure 6 in particular so that no pressure can be delivered thereto from the door closing operation until the end portions 18 and 19 have been compressed an amount equal to such relief. This would be an excessive amount of compression in most cases. The result is that the central or body portion of the bumper block is not required to transmit any force directly to the relatively sharp edge of the door pillar flange 11, thus still further ensuring against any shearing operations.

In the present case the bumper block is provided with the flange or skirt 17 which overlies the door pillar flange 11; and there is provided an ample slot 28 between said skirt 11 and the body portion 15 so that the bumper block can be effectively set and locked into place. In the present case also the rear edge portion of the body 15 of the bumper block is also carried back slightly beyond the edge of the opening 13 as shown at 29 in Figure 7 so that the door bumper will be firmly locked into place.

In arrangement shown in Figure 9 the central portion of the bumper block head 16 is raised up slightly as shown at 30 so that the same is required to make effective and definite contact with the door, being thus distinguished from the arrangement of Figures 6, 7, and 8.

While I have herein shown and described only certain embodiments of features of my present invention I do not intend to limit myself thereto except as I may do so in the claim.

I claim:

A door bumper comprising an elongated member of resilient material L-shaped in cross section, having a resilient retaining boss formed integral therewith connecting the adjacent arms of said member, said boss being intermediate the ends of said member and extending a portion of the length of said member whereby the arms of said member extend beyond the ends of the boss, the one arm of said member being of increased thickness whereby when the bumper is resiliently secured over the corner of an L-shaped piece of sheet metal the ends of said arm absorb most of the load in the direction of door closing movement and relieve the boss of destructive pressure, the face of the bumper intended for abutment by the door having a depressed portion provided therein lengthwise of the retaining boss, whereby the ends adapted to absorb the loads in the door closing movement stand in relief with respect to the portion not intended to absorb loads.

IRA D. PERRY.